United States Patent [19]
Asai

[11] Patent Number: 5,257,104
[45] Date of Patent: Oct. 26, 1993

[54] VIDEO SIGNAL PROCESSING APPARATUS

[75] Inventor: Toshiya Asai, Kanagawa, Japan

[73] Assignee: Sony Corporation, Japan

[21] Appl. No.: 863,963

[22] Filed: Apr. 6, 1992

[30] Foreign Application Priority Data

Apr. 9, 1991 [JP] Japan .................. 3-076537

[51] Int. Cl.$^5$ .................. H04N 7/04; H04N 7/08; H04N 5/04
[52] U.S. Cl. .................. 358/147; 358/335; 358/311; 360/14.3
[58] Field of Search ............... 358/149, 148, 147, 142, 358/210, 311, 335, 146, 22, 320, 337, 323, 325; 360/36.1, 36.2, 10.1, 10.3, 10.2, 14.1, 14.3

[56] References Cited

U.S. PATENT DOCUMENTS

| | | | |
|---|---|---|---|
| 4,175,267 | 11/1979 | Tachi | 358/147 X |
| 4,837,638 | 6/1989 | Fullwood | 360/14.2 |
| 5,027,193 | 6/1991 | Kani et al. | 358/12 |

FOREIGN PATENT DOCUMENTS 0311188 4/1989 European Pat. Off. .

OTHER PUBLICATIONS

The description of the Prior Art at pp. 1 through 3 of the specification and Figs. 1 and 2 as there discussed.

Primary Examiner—James J. Groody
Assistant Examiner—Safet Metjahic
Attorney, Agent, or Firm—Ronald P. Kananen

[57] ABSTRACT

A control circuit for controlling an output phase of a video signal is comprised of a variable type phase shifting circuit for phase-shifting the video signal by a designated phase shifting amount and a fixed type phase shifting circuit for phase-shifting the video signal by a constant phase shifting amount. A signal switch selects video signals from the designated and fixed type phase shifting circuits. The video signal from the fixed type phase shifting circuit is selected only during a predetermined period including at least ancillary data while the video signal from the variable type phase shifting circuit is utilized during other period. Thus, the ancillary data is constantly extracted from the video signal which is phase-shifted by the constant phase-shifting amount so that the inserting position of the ancillary data is not changed, regardless of the output phase amount. Thereby the ancillary data is extracted reliably. In other words, even when the output phase amount is varied, the position of the ancillary data inserted into the video signal can be prevented from being changed.

6 Claims, 6 Drawing Sheets

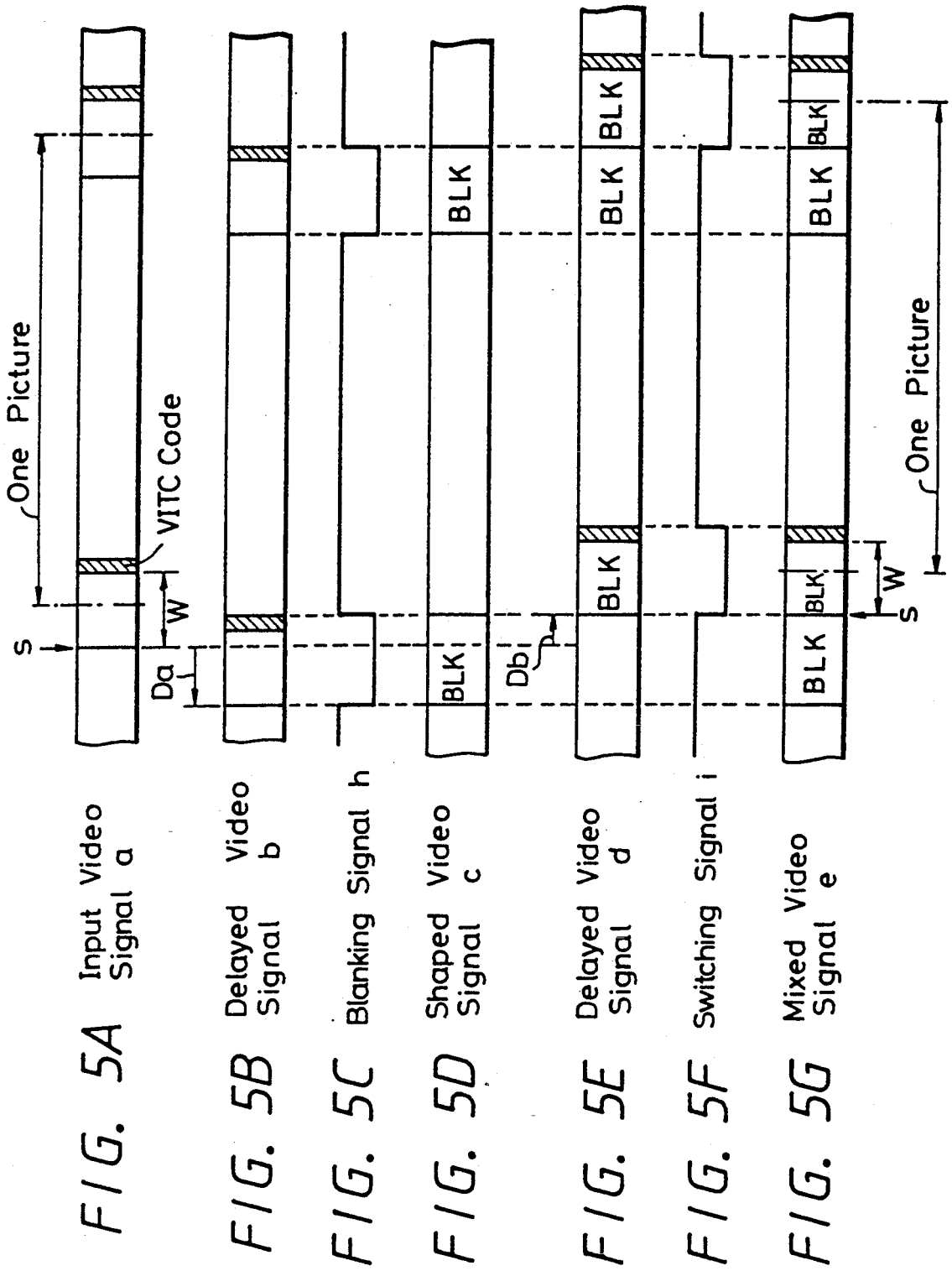

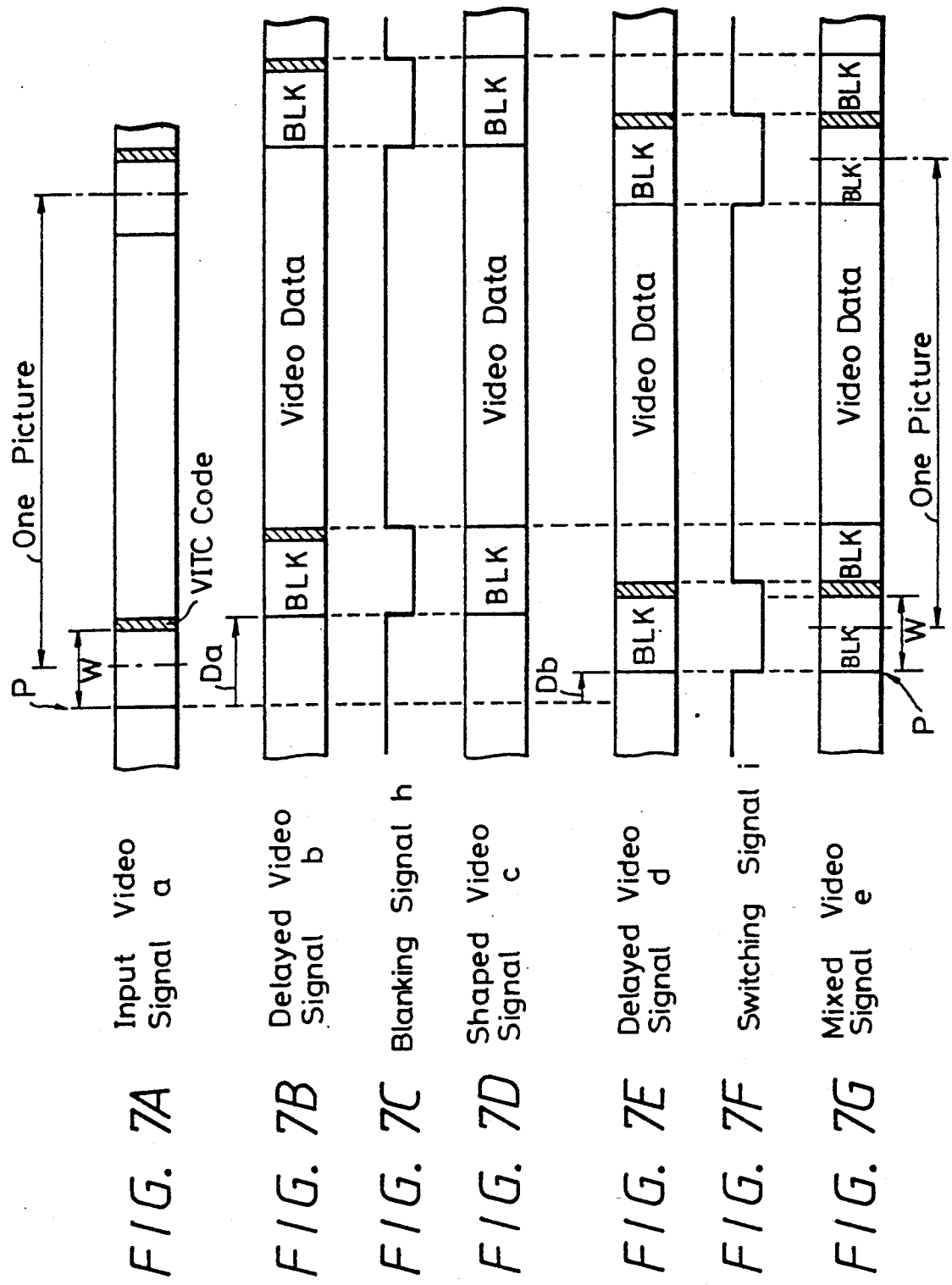

VIDEO SIGNAL PROCESSING APPARATUS

BACKGROUND OF THE INVENTION

1. Field of the Invention

The present invention relates generally to video signal processing apparatus and, more particularly to a video signal processing apparatus for use in a digital video tape recorder (digital VTR) which can realize special video effect processing or the like.

2. Description of the Prior Art

Digital video tape recorders or the like effect some proper signal processing on a reproduced video signal, such as an output phase of a reproduced signal or the like in order to realize special video effect processing. In such a digital VTR, an ancillary code such as a vertical interval time code (VITC code) is frequently inserted into the reproduced video signal. As is known, the VITC code is a time code which is inserted into an ancillary code area allocated to the period corresponding to the vertical blanking period (BLK period) such that the time code can be read out from the ancillary code area even in a variable speed playback mode.

When a video signal involving such ancillary code is reproduced and displayed on a picture screen of a monitor receiver, then a picture is displayed as shown in FIGS. 1A through 1C. The picture portion, which should be hidden by the blanking processing in actual practice, is represented in FIGS. 1A through 1C in order to gain a better understanding of the present invention.

FIG. 1A shows an example of a picture displayed on the picture screen before the output phase of the reproduced video signal is controlled. As shown in FIG. 1A, an ancillary area is hatched and vertical blanking areas are depicted by reference letters BLK. FIG. 1B shows an example of a picture displayed on the picture screen when a special effect processing is carried out by controlling the output phase of the video signal so as to shift a picture in the upward direction. By shifting the picture in the upper direction, the upper blanking area (BLK area) is erased from the picture screen. FIG. 1C shows an example of a picture displayed on the picture screen when a special effect processing is carried out by controlling the output phase of the video signal so as to shift a picture in the lower direction. In that case, the lower blanking area is erased from the picture screen.

The reason that the pictures are displayed as shown in FIGS. 1A through 1C will be described with reference to FIG. 2.

Referring to FIG. 2, when an area of exactly one picture screen from a reference point s is displayed, then the picture shown in FIG. 1A is presented. When the reference point is shifted (phase-shifted) from s to t, then the uppermost portion of the picture becomes the ancillary area and therefore the picture shown in FIG. 1B is presented. Further, when the video signal is phase-shifted so as to shift the reference point from s to u, then the blanking area in the uppermost portion of the picture screen is increased but the blanking area of the lowermost portion of the picture screen is cut, resulting in the picture being displayed as shown in FIG. 1C.

When the above-mentioned special effect processing is carried out, as is clear from FIG. 2, the phase shift of the output video signal is substantially equivalent to the phaseshift processing of the entirety of the video signal involving the ancillary area with the result that ancillary data inserting positions from the reference points s, t, u are changed with the phase-shift amount of the output phase. For this reason, the following problems arise:

In the video signal processing circuit such as the special effect processing circuit or the like, the above-mentioned ancillary data, e.g., VITC code, is extracted to obtain time code data in the variable speed playback mode, and this time code data must be transferred to a system controller or the like. To this end, a VITC code gate circuit is provided and the gate circuit generates a gating signal on the basis of the reference point s. Thus, when the reference point is phase-shifted by a phase-shift amount over one line such as from the reference point t or u, then the position of the gating signal is changed, which makes it impossible to correctly extract the VITC code.

If the output video signal thus phase-shifted is copied by another VTR by dubbing, for example, the position of the inserting line of the VITC code is changed so that the VITC code cannot be detected correctly, as described above.

OBJECTS AND SUMMARY OF THE INVENTION

Therefore, it is an object of the present invention to provide an improved video signal processing apparatus in which the aforesaid shortcomings and disadvantages encountered with the prior art can be eliminated.

More specifically, it is an object of the present invention to provide a video signal processing apparatus in which an insertion position of ancillary data from a reference point is not varied even when a shift amount of the output phase is large.

It is another object of the present invention to provide a video signal processing apparatus for use with a digital video tape recorder.

As an aspect of the present invention, a video signal processing apparatus comprises a control circuit for controlling an output phase of a video signal. This control circuit is comprised of a variable type phase shifting circuit for phase-shifting the video signal by a designated phase shifting amount and a fixed type phase shifting circuit for phase-shifting the video signal by a constant phase shifting amount. A switching means selects first and second video signals. The second video signal is selected only during a predetermined period including at least ancillary data while the first video signal is utilized during other period. Thus, the ancillary data is constantly extracted from the second video signal which is phase-shifted by the constant phase-shifting amount so that the inserting position of the ancillary data is not changed regardless of the output phase amount, thereby the ancillary data being extracted reliably. In other words, even when the output phase amount is varied, the position of the ancillary data inserted into the video signal can be prevented from being changed.

The above and other objects, features, and advantages of the present invention will become apparent from the following detailed description of an illustrative embodiment thereof to be read in conjunction with the accompanying drawings, in which like reference numerals are used to identify the same or similar parts in the several views.

BRIEF DESCRIPTION OF THE DRAWINGS

FIGS. 5A through 5G are diagrams used to explain an example of the video signal processing in FIG. 4;

FIGS. 7A through 7G are diagram used to explain an example of the video signal processing according to the present invention.

DETAILED DESCRIPTION OF THE PREFERRED EMBODIMENT

A video signal processing apparatus according to an embodiment of the present invention will now be described in detail with reference to the drawings. In this embodiment, the video signal processing apparatus is applied to a reproducing system of the above-mentioned digital VTR.

Figure 3:
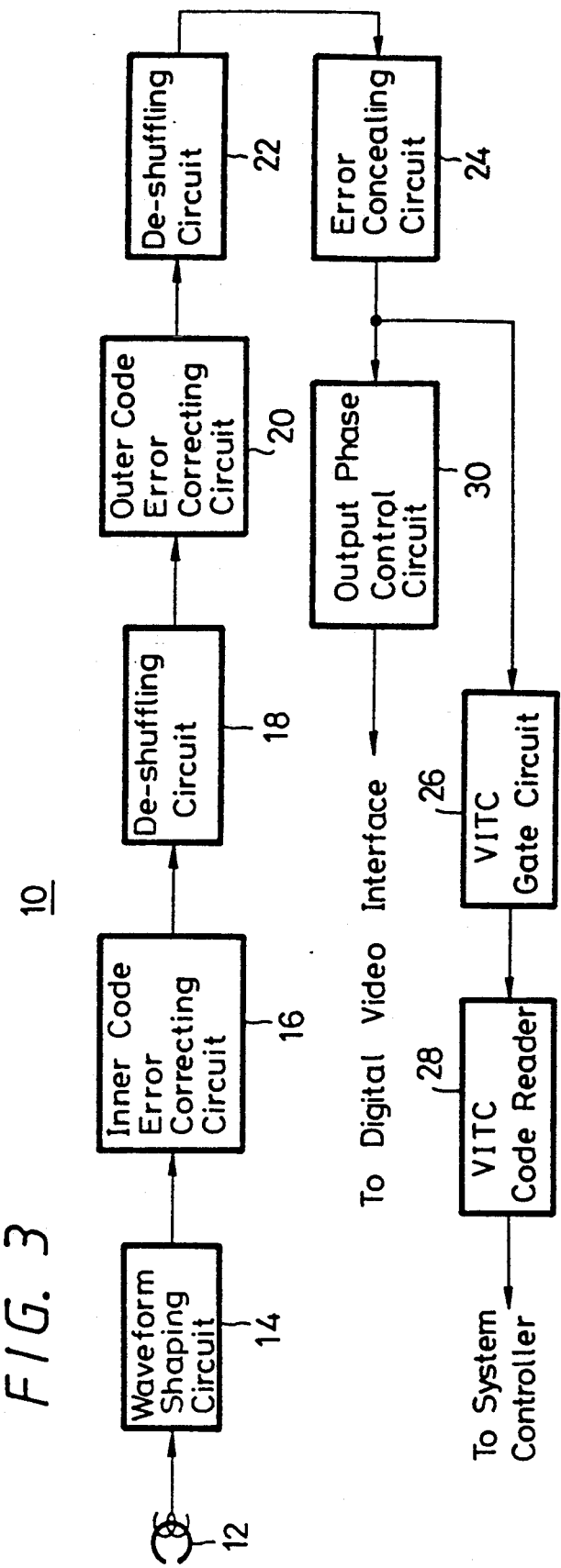
FIG. 3 is a block diagram showing a video signal processing apparatus according to an embodiment of the present invention.

FIG. 3 of the accompanying drawings shows a video signal processing circuit 10 according to an embodiment of the present invention.

Although the digital VTR employs four rotary magnetic heads (4-channel arrangement) as playback heads, a single playback head depicted by reference numeral 12 is illustrated in FIG. 3 for simplicity. A video signal (digital video signal) reproduced by the playback head 12 from a magnetic tape (not shown) is supplied through a waveform shaping circuit 14 to an inner code error correcting circuit 16, in which it is error-corrected in inner code. The digital video signal thus error-corrected is supplied to a de-shuffling circuit 18, in which a data group having 50 lines per segment is de-shuffled.

Thereafter, an output digital video signal from the deshuffling circuit 18 is supplied to and error-corrected in outer code by an outer code error correcting circuit 20 and fed to a de-shuffling circuit 22, in which data of channels are deshuffled. In addition to the above-mentioned signal processing, the output signal from the de-shuffling circuit 22 is supplied to and error-concealed by an error concealing circuit 24, thereby is restored to the original video signal. The video signal thus restored is supplied to an output phase controlling circuit 30, which is an essential portion of the present invention, in which the output phase of this video signal is controlled as described above, and then fed to a digital video interface (not shown).

The restored video signal from the error concealing circuit 24 is also supplied to a gate circuit 26 for the ancillary code, e.g., VITC code, in which the VITC code is extracted from the video signal. The VITC code thus extracted is decoded by a VITC code reader 28 and the time code data thus decoded is supplied to a system controller (not shown) or the like, thereby utilized as a part of system control data.

Figure 4:
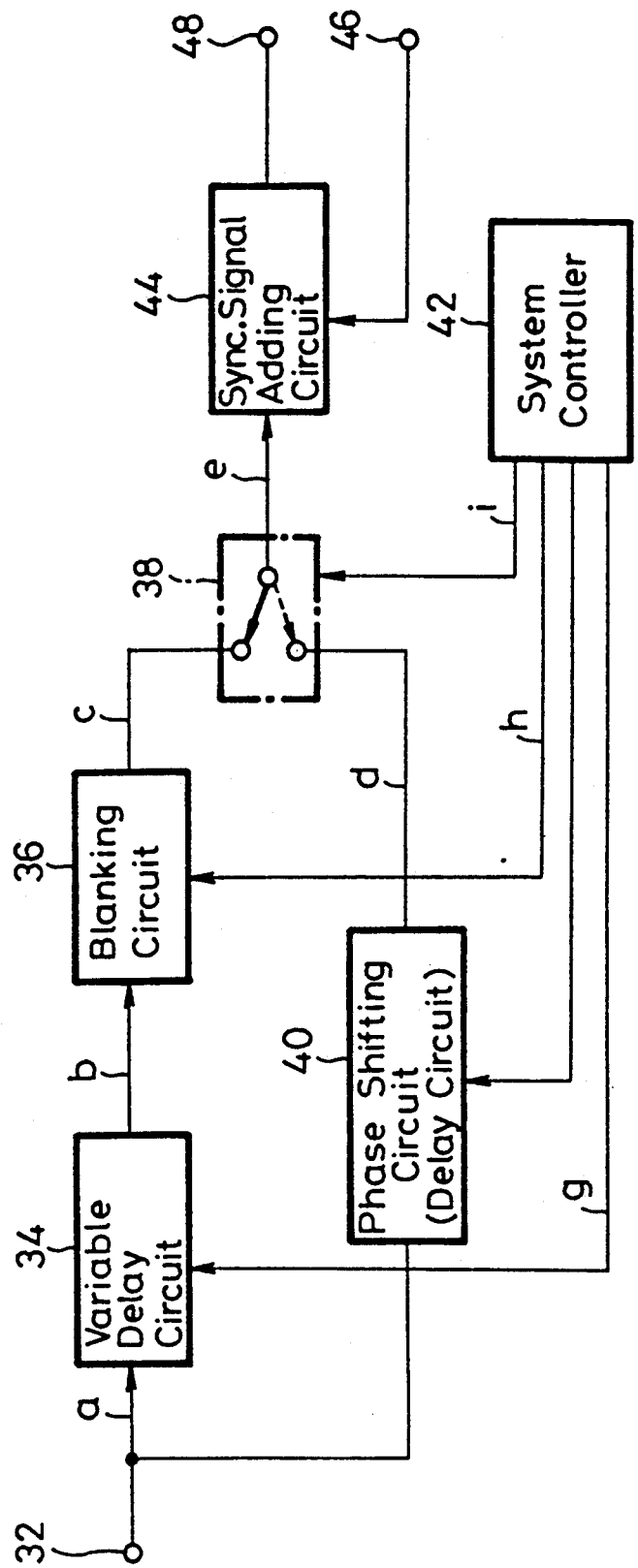
FIG. 4 is a block diagram showing an example of an output phase control circuit which is a main portion of the video signal processing circuit according to the present invention.

According to this invention, the output phase control circuit 30 for a video signal is constructed as shown in FIG. 4 and will be described below with reference also to FIGS. 5A through 5G.

Referring to FIG. 4, the restored video signal a (see FIG. 5A) supplied to an input terminal 32 is supplied to and phase-shifted by a predetermined shift amount, i.e., delayed by a predetermined time Da (see FIG. 5B) by a phase-shifting circuit of a variable type, i.e., by a delay circuit 34 in this embodiment. The delay time Da is determined by a delay amount instructing signal g from a system controller 42. A video signal b (see FIG. 5B) thus delayed is supplied to a blanking circuit 36, in which a blanking signal having a VITC code involved in this video signal is processed by a blanking process to provide a shaped video signal c shown in FIG. 5D. To this end, a blanking signal h shown in FIG. 5C is supplied from the system controller 42 to the blanking circuit 36.

The input video signal a is further supplied to and phase-shifted by a predetermined shift amount Db (see FIG. 5D) by a phase-shifting circuit 40 of a fixed type. In this embodiment, the phase-shifting circuit 40 is formed of a delay circuit whose delay time is Db as described above. The delay time Db can be selected to be about half of the above-mentioned delay time Da. The delayed video signal d (see FIG. 5E) and the above shaped video signal c are supplied to a switching means 38 which selects one of the video signals d and c in response to a switching signal i (see FIG. 5F) from the system controller 42.

More specifically, when the switching signal i is at low level, the switching means 38 is connected, as shown by a broken line contact in FIG. 4, to select the blanking signal involving the VITC code inserted into the delayed video signal d output from the delay circuit 40. During other periods, the switching means 38 is connected as shown by a solid contact in FIG. 4 to select the shaped video signal c output from the blanking circuit 36. Consequently, the switching means 38 derives a mixed video signal e which is illustrated in FIG. 5G.

Since the mixed video signal e utilizes the blanking signal involving the VITC code of the delayed video signal d output from the fixed delay circuit 40 as the blanking signal thereof, the inserting position of the VITC code from the reference point s is not changed regardless of the output delay amount.

The mixed video signal e is supplied to and added with a synchronizing (sync.) signal (a frame pulse and a horizontal sync. pulse in this embodiment) from a terminal 46 by a sync. signal adding circuit 44 and then fed to an output terminal 48.

Figure 1A:
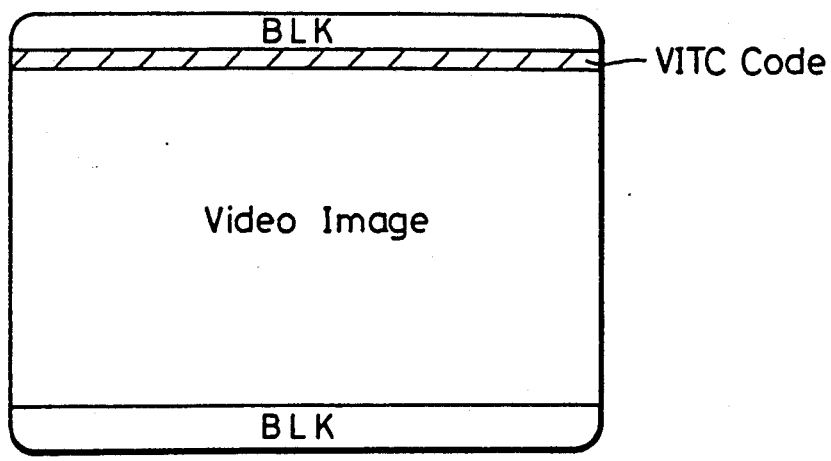
FIGS 1A through 1C are respectively schematic diagrams showing examples of pictures displayed on the picture screens and to which references will be made in explaining the video signal processing.
Figure 1B:
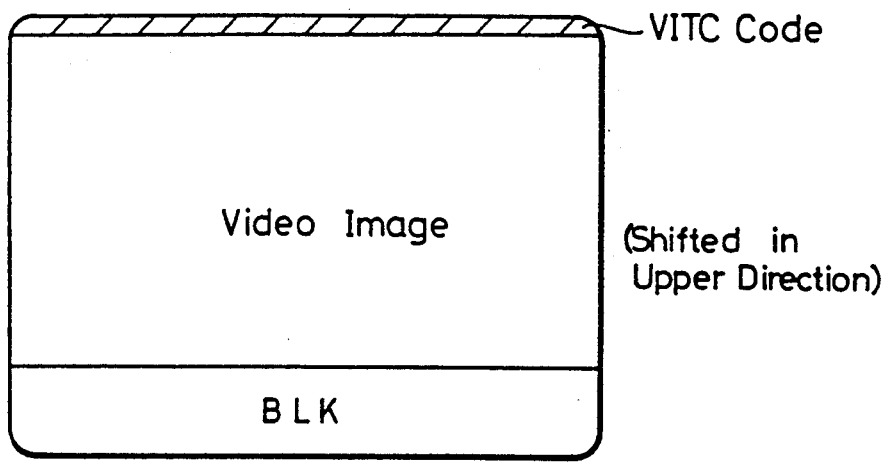
Figure 1C:
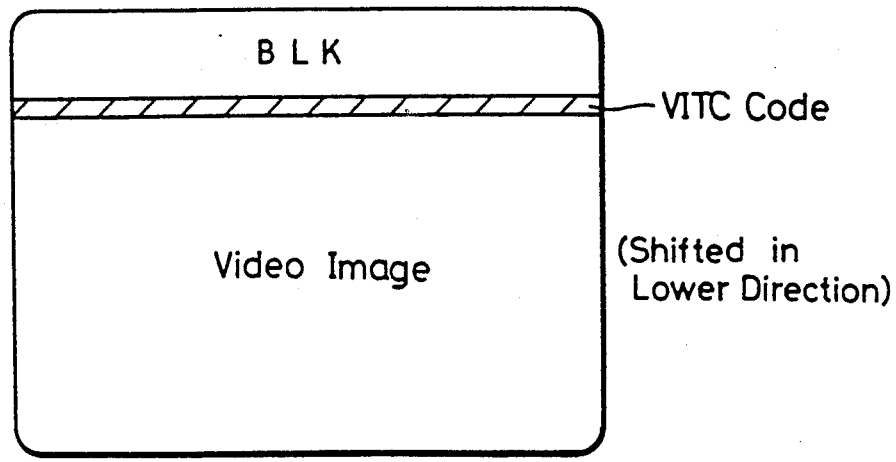
Figure 2:
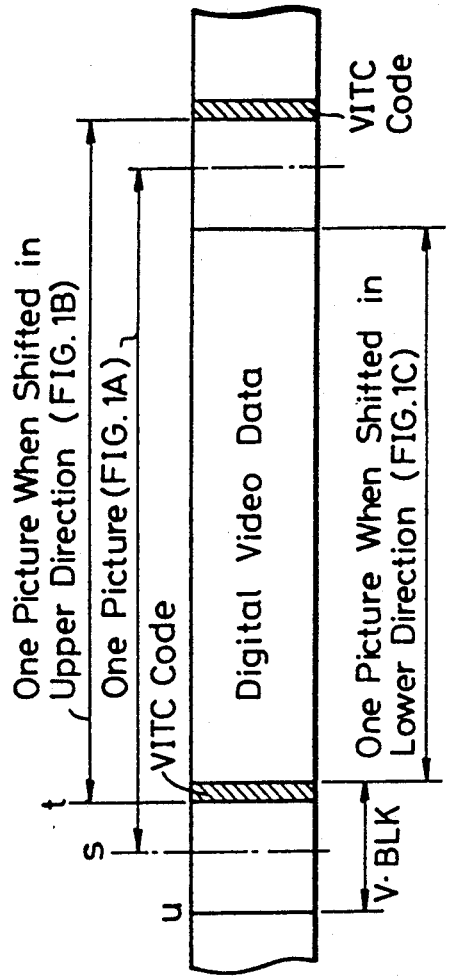
FIG. 2 is a schematic diagram used to explain a video signal.
Figure 6A:
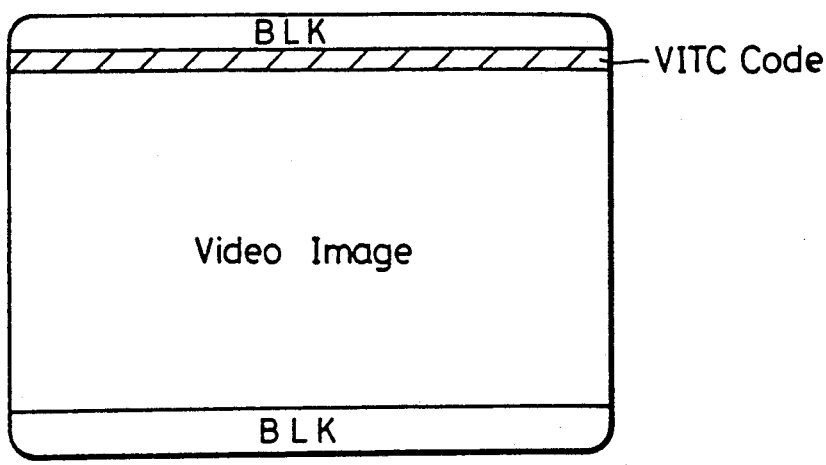
FIGS. 6A through 6C are respectively schematic diagrams showing examples of pictures displayed on the picture screen and to which references will be made in explaining the video signal processing in FIG. 4.
Figure 6B:
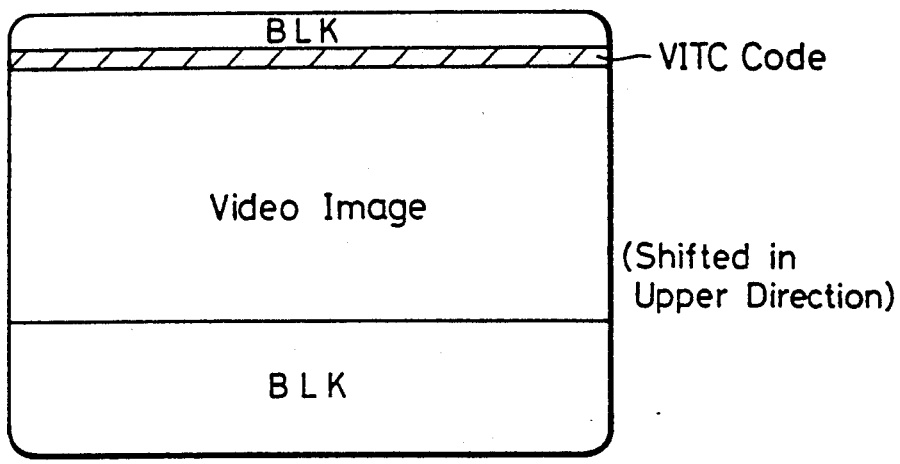
Figure 6C:
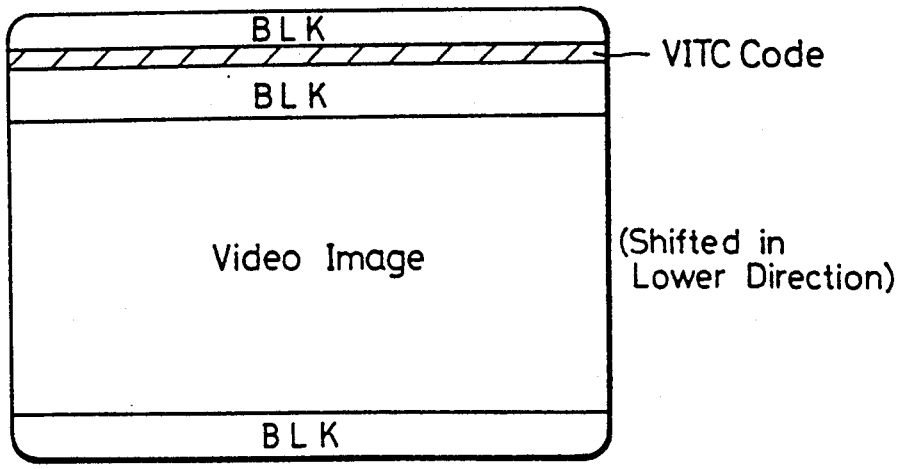

Operation of the output phase control circuit 30 shown in FIG. 4 will be described next. FIGS. 6A through 6C illustrate picture screens similar to those of FIGS. 1A through 1C. FIG. 6A shows an example of a reference picture displayed on the picture screen under the condition such that the reproduced video signal is not delayed and provided as the mixed video signal e. Accordingly, the displayed picture is exactly the same as that of FIG. 1A. FIG. 6B illustrates an example of a displayed picture under the condition that the picture is shifted in the upper direction, and FIG. 6C illustrates an example of a displayed picture under the condition such that the picture is shifted in the lower direction. As will be clear from FIGS. 6A, 6B and 6C, the inserting positions (picture positions) of the VITC code are not changed even when the picture is shifted in the upper or lower direction.

The VITC code is inserted into the input video signal at its position distant from the reference point s by a distance w as shown in FIG. 5A. When the picture is shifted in the upper direction, then the delayed video signal b is represented as shown in FIG. 5B and the blanking signal including the VITC code inserted into the delayed vide signal b is masked so that the shaped video signal c has no VITC code and blanking signal. Further, except that the VITC code and the blanking signal from the fixed delay circuit 40 side are selected and added, the video signal c from the variable delay circuit 34 is utilized and therefore the mixed video signal e becomes as shown in FIG. 5G, in which the original video data interval is reduced as compared with that of the normal mode. Therefore, the picture is represented as shown in FIG. 6B.

Since the reference point of the mixed video signal e is s, the position of the VITC code inserted into the mixed video signal e with the distance w from the reference point s is the same as that of the video signal a in the normal mode.

FIGS. 7A through 7G explain an example of the video signal processing under the condition such that the picture is shifted in the lower direction. Though not fully described herein, also in this case, a new VITC code after the video signal is mixed is the VITC code of the video signal d which is delayed by the fixed delay circuit 40 so that the duration w from the reference point s to the VITC code for constructing one picture screen is constant. Therefore, the picture shown in FIG. 6C is presented.

While the VITC code is referred to as the signal inserted into the ancillary data zone provided within the blanking period, this signal is not limited to the VITC code, for example, video index data or the like may be utilized. The phase shifting circuits 34 and 40 are not limited to the delay circuits. A variantion possible, in which a field memory of an first-in first-out (FIFO) configuration is utilized and a difference between write timing and read timing thereof is controlled as an output phase amount by the system controller 42. Further, the duration of the blanking signal h is not limited to the blanking period and might be a pulse width wide enough to extract at least the ancillary data zone. Accordingly, the duration of the blanking period h might be selected to be equal to that of the period in which the VITC code is inserted, for example.

As described above, in the video signal processing apparatus according to the present invention, the phase shift amount of the video signal in which the ancillary data inserted into the ancillary data zone is extracted is fixed and the ancillary data extracted therefrom is added to the video signal side the output phase amount of which is varied.

According to this arrangement, since the inserting position (position of the inserted line) of the ancillary data inserted into the output video signal is always set constant regardless of the change of the output phase amount, the ancillary data can be reliably extracted no matter how the output phase amount of the output video signal is controlled in order to perform the video special effect. There is then no risk that the ancillary data will not be extracted or that the position of the inserted line will be fluctuated due to the dubbing.

Having described the preferred embodiment of the invention with reference to the accompanying drawings, it is to be understood that the invention is not limited to that precise embodiment and that various changes and modifications thereof could be effected by one skilled in the art without departing from the spirit or scope of the invention as defined in the appended claims.

What is claimed is:

1. A video signal processing apparatus for processing an input video signal, said video signal including ancillary data inserted into a predetermined period within a vertical blanking period, comprising:

a control circuit for controlling an output phase of said video signal, said control circuit including a variable phase shifting circuit for phase-shifting said video signal by a variable phase amount a fixed phase shifting circuit for phase-shifting said video signal by a constant amount, and switching means for providing a switched output video signal switching between an output video signal from said variable phase shifting circuit and an output video signal from said fixed phase shifting circuit, whereby said switched output video signal includes ancillary data output from said fixed phase shifting circuit regardless of the output phase amount.

2. A video signal processing apparatus according to claim 1, in which said variable phase shifting circuit comprises a delay circuit and said fixed phase shifting circuit comprises a delay circuit.

3. A video signal processing apparatus according to claim 1, in which said control circuit further comprises a blanking circuit for blanking a blanking signal of said video signal, wherein said blanking circuit is coupled to said variable phase shifting circuit, and a synchronizing signal to video signal.

4. A video signal processing apparatus according to claim 3, further comprising a system controller which controls said variable phase shifting circuit, said fixed phase shifting circuit, said blanking circuit and said switching means.

5. A video signal processing apparatus according to claim 3, in which said switched output video signal switched by said switching means includes a predetermined period including ancillary data from said fixed type phase shifting circuit and a video signal from said variable type phase shifting circuit in a period other than said predetermined period.

6. A video signal processing apparatus according to claim 1, in which said ancillary data comprises vertical interval time code (VITC).

* * * * *